May 17, 1949.　　　　　R. K. SEDGWICK　　　　　2,470,583
RELIEF VALVE CONTROL SYSTEM
Filed May 22, 1944　　　　　　　　　　　　　2 Sheets-Sheet 1
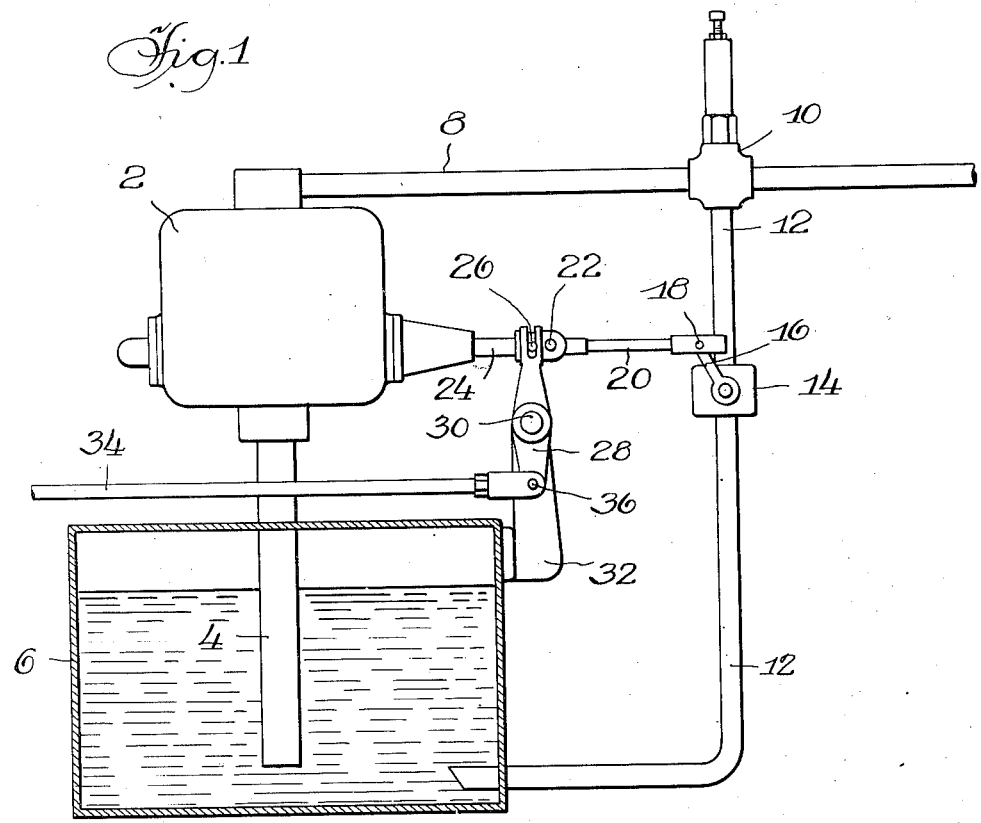
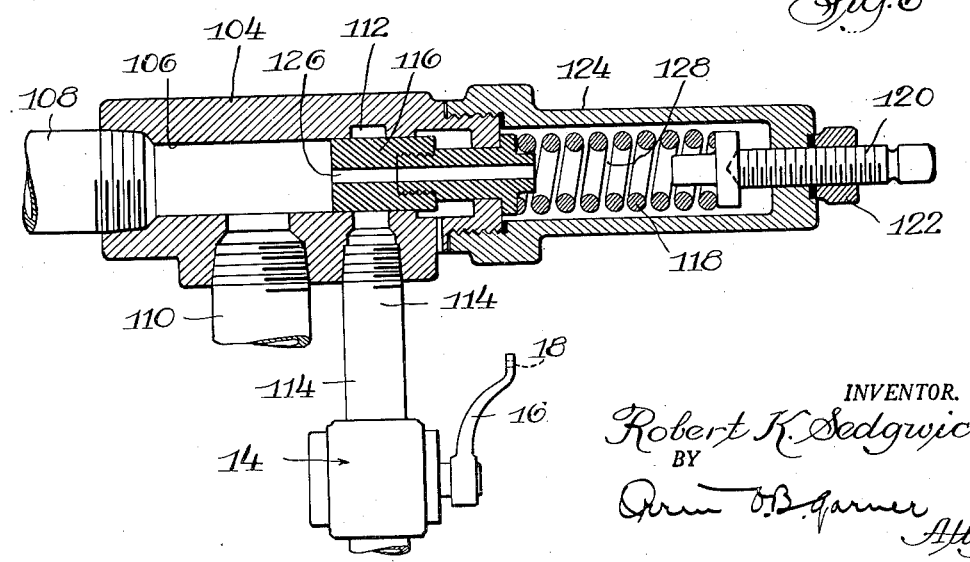
INVENTOR.
Robert K. Sedgwick
BY
Orrin B. Garner
Atty.

May 17, 1949.    R. K. SEDGWICK    2,470,583
RELIEF VALVE CONTROL SYSTEM
Filed May 22, 1944    2 Sheets-Sheet 2

INVENTOR.
Robert K. Sedgwick,
BY
Orrin B. Garner
Atty

Patented May 17, 1949

2,470,583

UNITED STATES PATENT OFFICE 2,470,583

RELIEF VALVE CONTROL SYSTEM

Robert K. Sedgwick, Chicago, Ill., assignor to American Steel Foundries, Chicago, Ill., a corporation of New Jersey Application May 22, 1944, Serial No. 536,653

15 Claims. (Cl. 103—42)

1

My invention relates to an hydraulic system or circuit for actuation of an associated hydraulic device such, for example, as a press, and my invention relates more particularly to a system incorporating a relief valve which, in response to a predetermined pressure acting thereon, releases an outlet or downstream opening to relieve the pressure therethrough.

The general object of my invention is to devise such a system in which the downstream orifice of the relief valve means is adjustable, thus accommodating a predetermined back-pressure therein for the purpose of preventing chattering or hunting of the valve stem. It will be understood that most relief valves utilized in high pressure systems require the use of correspondingly strong control springs, and the valve stem frequently vibrates or chatters violently, thus causing breakage of delicate gauges connected thereto and rendering impossible stabilization of the desired pressure. It is well known that the highest velocity of the pressure fluid in such a relief valve is across the seat defining the downstream orifice thereof, this point thus being the point of lowest pressure, and it is believed that this condition causes the above-mentioned chattering of the valve stem unless a slight back-pressure is built up in said downstream orifice.

A specific object of my invention is to provide means for adjusting the downstream orifice of the relief valve automatically with the adjustment of the rate of flow of a variable discharge pump which is commonly utilized as a source of pressure in such a system. In order to effect a predetermined back-pressure in a relief valve, the downstream orifice thereof must be adjusted to the rate of flow. Thus, a high rate of flow necessitates a relatively large orifice, and a low rate of flow necessitates a relatively small orifice in order to attain a constant predetermined back-pressure which will effectively prevent chattering of the relief valve stem under all operating conditions to which the press may be subjected.

It will be understood that many presses require a hydraulic circuit in which a variable discharge pump is utilized for the purpose of varying the speed of the ram stroke during a cycle of operations, as, for example, in a drill press wherein it is desirable to have the ram move at a rapid rate until the drill carried thereby engages the work, and thereafter at one or more slower or "feed" rates. This is frequently accomplished by automatic controls which, without any attendance by the operator, shift the pump yoke at various stages in the cycle of operations to

2 vary the speed of the ram. It is therefore the primary object of the present invention to provide means for automatically regulating the adjustable downstream orifice of the relief valve whenever, during a cycle of operations, the discharge rate of the pump is varied for any desired purpose.

I accomplish the objects of my invention by connecting the actuating means for the adjustable relief valve orifice to the pump adjusting means as, for example, the yoke of a conventional variable discharge pump.

In the drawings, Figure 1 is a fragmentary diagrammatic illustration of a hydraulic circuit embodying my invention.

Figure 6 is a sectional view through a modified relief valve which may be utilized in my novel system.

Figure 2:
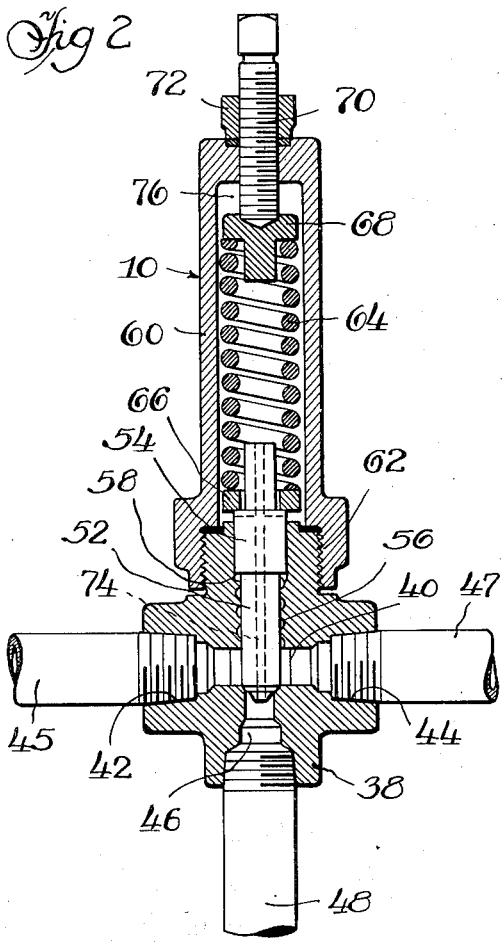
Figure 2 is a sectional view taken through the relief valve.

Describing my invention in detail and referring first to Figure 1, my novel system comprises a conventional variable discharge pump 2 connected by means of a suction pipe 4 to a tank or reservoir 6 containing a supply of hydraulic fluid for the system. The discharge side of the pump 2 is connected to a supply line 8 which is adapted for connection to any suitable hydraulic device such as, for example, a press (not shown). A relief valve 10 is mounted in the line 8 and is connected to the downstream or return line 12 which communicates with the tank 6. A restriction valve 14 is mounted in the return line 12 and comprises an actuating handle 16 pivotally connected at 18 to one end of a link 20 which is pivotally connected at 22 to the yoke 24 of the pump 2, said yoke being connected in conventional manner at 26 to an actuating lever 28 which is pivotally fulcrumed at 30 from a fulcrum member 32 mounted in any convenient manner on the tank 6.

A control rod 34 is pivotally connected at 36 to the lower end of the lever 28 for actuation thereof. It will be readily understood by those skilled in the art that by means of the control rod 34 the lever 28 is rotated in either direction about its pivot point 30, thus shifting the yoke 24 of the pump to adjustably vary the discharge rate thereof, and it will also be understood that said control rod may be manually operated or may be connected to any desired automatic actuating means such as commonly utilized in hydraulic presses.

Figure 3:
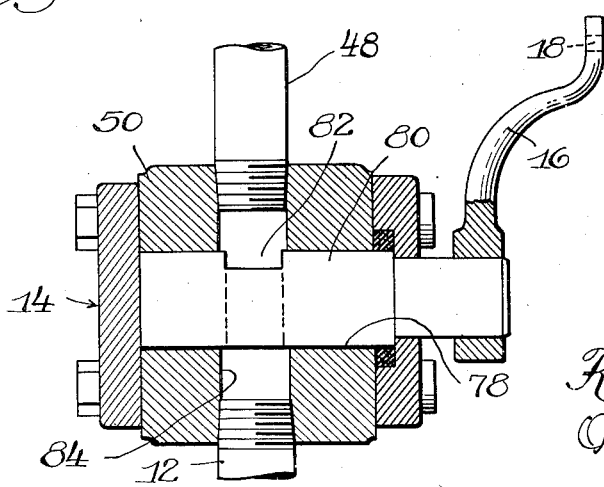
Figure 3 is a sectional view through the restriction valve.

Referring now to Figures 2 and 3, it will be seen that the relief valve 10 comprises a body 38 with a chamber 40 comprising an inlet port 42 and an outlet port 44 for connection respectively to a pipe line 45 leading to the pump 2 and a pipe line 47 leading to the press (not shown), both of said pipe lines being a part of the supply line 8 (Figure 1). The body 38 also comprises a downstream opening or port 46 connected by means of a pipe 48 to the body 50 of the restriction valve 14. It will be understood that while the relief and restriction valves 10 and 14 are herein illustrated as separate devices, they may, if desired, be combined in a single valve by making the bodies 38 and 50 integral with each other.

The inner extremity of the downstream port 46 is provided with a conical seat which is closed by a complementary seat of the valve stem or spindle 52 which comprises a piston-like portion 54 slidably fitted within a complementary bore in the body 38, said bore being provided with a spiral groove 56 communicating with the chamber 40 to permit the passage of pressure fluid therefrom to act upon the area 58 of the piston-like portion 54 of the valve stem.

A spring housing or bonnet 60 is secured in any convenient manner, as by threading at 62, to the body 38, and said bonnet 60 houses an adjustable compression spring 64 bearing at one end thereof against a spring cap or washer 66 slidably mounted on the stem 52, the opposite end of said spring being seated against a spring cap or guide 68 carried by an adjusting screw 70 which extends through an opening in the bonnet 60 to afford external adjustment of the spring 64. The screw 70 is provided with a lock nut 72 for the purpose of locking the same in any desired adjusted position thereof.

The stem 52 comprises an opening 74 communicating with the chamber 76 within the bonnet 60 to permit drainage thereof. The passage 74 also serves the function of permitting passage of fluid into the chamber 76 when the stem 52 is in its open position, thus affording a stabilizing back-pressure against said stem within the chamber 76 for the purpose of preventing chattering or hunting of said stem in its open position.

The body 50 of the restriction valve 14 is provided with a bore 78 within which is slidably mounted a rotatable stem 80 having a notch 82 defining with the passage 84 through the body 50 an adjustable downstream orifice through which pressure fluid in the system flows to the tank 6 when the stem 52 of the relief valve 10 is in its open position.

In the operation of my novel system, the pump 2 supplies pressure fluid at any desired rate or rates through the pipe line 8 to the press (not shown). Whenever the pressure in the line 8 exceeds a predetermined maximum, depending upon the compression of the spring 64 by the screw 72, the pressure fluid acting through the groove 56 against the area 58 of the stem 52 moves the latter to its open position against the resistance of the spring 64, thus permitting the flow of pressure fluid through the downstream opening 46 and the downstream orifice 82 into the tank 6. Under these conditions, the pressure fluid flows through the passage 74 into the chamber 76 where it acts upon an area of the stem 52 less than the area acted upon by the fluid in the chamber 40. It will be understood that the fluid pressure in the chamber 76 acts in the same direction as the spring 64 to urge the stem 52 toward its closed position and has the effect of stabilizing the action of the stem to prevent chattering thereof; however, it will be understood by those skilled in the art that the passage 74, may, if desired, be eliminated and the stem may be stabilized substantially as effectively by means of the back-pressure built up by the restricted orifice within the restriction valve 14.

Figure 4:
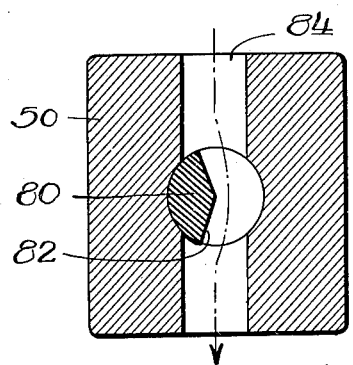
Figures 4 and 5 are corresponding sectional views through the restriction valve taken in a plane approximately at right angles to that of Figure 3, Figure 4 showing a setting in which the restriction valve orifice is fully open, and Figure 5 showing a setting in which the orifice is nearly closed.
Figure 5:
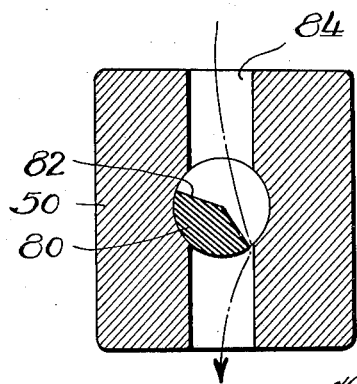

It will be understood that when the pump 2 is operated at a relatively fast rate, the restriction valve will be in the fully open position illustrated in Figure 4, however, as the pump yoke 24 (Figure 1) is shifted by means of the control rod 34 to lower the discharge rate of the pump, the restriction valve 14 is gradually closed until it reaches the extreme restricted setting shown in Figure 5. By means of this novel arrangement, a substantially constant back-pressure is built up in the downstream opening 46 despite any variation in the discharge rate of the pump during a cycle of operations.

Figure 6 illustrates a modified form of the relief valve comprising a body 104 having a bore 106 connected to a pipe line 108 leading to the pump and to a pipe line 110 leading to an associated hydraulic device, such as a press.

The bore 106 is provided with an annular chamber 112 communicating by means of a pipe 114 with the restriction valve 14 which is connected by means of the actuating handle 16 to the link 20 (Figure 1).

The valve stem 116 in its closed position, illustrated in Figure 6, is operable to prevent the passage of pressure fluid into the restriction valve 14 and the stem 16 is urged to its closed position by means of a compression spring 118 which is adjustably compressed by means of a screw 120, provided with a lock nut 122, the spring 118 being conveniently housed within a bonnet or spring housing 124 which is secured in any convenient manner to the body 104. The stem 116, as in the previously described embodiment, comprises a passage 126 therethrough affording a means of communication between the bore 106 and the chamber 128 within the bonnet 124 to afford a stabilizing back-pressure against a relatively small area of the stem 116. The passage 126 may, if desired, be eliminated as in the previously described embodiment. It will be understood that the modification shown in Figure 6 may be substituted for the relief valve 10 in the system diagrammatically shown in Figure 1.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In an hydraulic system comprising a pump mechanism including a yoke for adjustably varying the discharge rate thereof, the suction side of said mechanism being connected to a fluid reservoir, and the discharge side of said mechanism being connected to a supply line adapted for communication with an associated hydraulic device, the combination of a valve comprising a casing with an internal chamber communicating with an inlet port connected to said line and a downstream outlet port connected to said reservoir; a bore within said casing, a valve stem reciprocally mounted within said bore and comprising means for closing said outlet port in the closed position of said stem, said stem having an area adapted to be acted upon by pressure fluid admitted through said inlet port for moving said stem to its open position, a chamber associated with said casing and housing yielding means for continuously urging said stem toward its closed position, a passageway through said stem for effecting hydraulic communication between said chambers in the open position of said stem to convey pressure fluid into said second-mentioned chamber for acting on an opposed area of said stem in the same direction as said yielding means, said second-mentioned area being substantially smaller than that acted upon by pressure fluid from said inlet port, an adjustable orifice in the connection between said outlet port and said reservoir, means for adjustably varying the area of said orifice, and means operatively connecting said last-mentioned means to said yoke for actuation thereby.

2. In an hydraulic system comprising variable discharge pump means connected at the suction side thereof to a fluid reservoir and connected at the discharge side thereof to a supply line adapted for communication with an associated hydraulic device, the combination of a valve comprising a casing with a fluid chamber having an inlet port connected to said line and an outlet port connected to said reservoir, a bore within said casing communicating with said chamber, a valve stem reciprocally mounted within said bore and comprising means for closing said outlet port in the closed position of said stem, said stem having an area adapted to be acted upon by pressure fluid admitted through said inlet port for moving said stem to its open position, another chamber associated with said casing and housing yielding means for continuously urging said stem toward its closed position, a passageway through said stem for effecting hydraulic communication between said chambers to convey pressure fluid into said second-mentioned chamber for acting on an area of said stem in the same direction as said yielding means, said second-mentioned area being smaller than that which is acted upon by pressure fluid from said inlet port in the open position of said stem, an adjustable orifice in the connection between said outlet port and said reservoir, and means for automatically varying the cross-sectional area of said orifice simultaneously with the variance of the discharge rate of said pump means.

3. In an hydraulic system comprising a pump mechanism including a yoke for adjustably varying the discharge rate of said mechanism, the suction side of said mechanism being connected to a fluid reservoir and the discharge side of said mechanism being connected to a supply line adapted for communication with an associated hydraulic device, the combination of a relief valve comprising a casing with an internal bore communicating with an inlet port connected to said line and a downstream outlet port connected to said reservoir, a valve stem reciprocally mounted within said bore and comprising means for closing said outlet port in the closed position of said stem, said stem having an area adapted to be acted upon by pressure fluid admitted through said inlet port for moving said stem to its open position, a spring housing associated with said casing and containing yielding means for continuously urging said stem toward its closed position, an adjustable orifice in the connection between said outlet port and said reservoir, means for adjustably varying the cross-sectional area of said orifice, and means operatively connecting said last-mentioned means to said yoke for actuation thereby.

4. In an hydraulic system comprising variable discharge pump means connected at the suction side thereof to a fluid reservoir and connected at the discharge side thereof to a supply line adapted for communication with an associated hydraulic device, the combination of a relief valve comprising a body with an internal bore communicating with an inlet port connected to said line, and an outlet port connected to said reservoir, a valve stem reciprocally mounted within said bore and comprising means for closing said outlet port in the closed position of said stem, said stem having an area adapted to be acted upon by pressure fluid admitted through said inlet port for moving said stem to its open position, a spring housing associated with said body and housing yielding means for continuously urging said stem toward its closed position, an adjustable orifice in the connection between said outlet port and said reservoir, and control means for simultaneously increasing the cross-sectional area of said orifice and the discharge rate of said pump means, said control means being operable to simultaneously decrease the cross-sectional area of said orifice and the discharge rate of said pump means.

5. In an hydraulic system comprising variable discharge pump means connected at the suction side thereof to a fluid reservoir and connected at the discharge side thereof to a supply line adapted for communication with an associated hydraulic device, the combination of a valve comprising a casing with an internal bore communicating with an inlet port connected to said line and a downstream outlet port connected to said reservoir, a valve stem reciprocally mounted within said bore and comprising a conical seat portion for engagement with a complementary conical seat defining the margin of said outlet port for closing the latter in the closed position of said stem, said stem having an area adapted to be acted upon by pressure fluid admitted through said inlet port for moving said stem to its open position, a spring housing associated with said casing and containing yielding means for continuously urging said stem toward its closed position, an adjustable orifice in the connection between said outlet port and said reservoir, and means for automatically varying the cross-sectional area of said orifice simultaneously with the variance of the discharge rate of said pump means.

6. In an hydraulic system comprising variable discharge pump means connected at the suction side thereof to a fluid reservoir and connected at the discharge side thereof to a supply line adapted for communication with an associated hydraulic device, the combination of a valve comprising a casing with an internal bore having an inlet port connected to said line, an annular chamber within said casing communicating with said bore and comprising a downstream outlet port connected to said reservoir, a valve stem reciprocally mounted within said bore and operable to close said outlet port, said stem having an area at one end thereof adapted to be acted upon by pressure fluid admitted through said inlet port for moving said stem to its open position, a spring housing associated with said casing and containing yielding means for continuously urging said stem toward its closed position, an adjustable orifice in the connection between said outlet port and said reservoir, and mean for automatically varying the cross sectional area of said orifice simultaneously with the variation in the discharge rate of said pump means.

7. In an hydraulic system comprising variable discharge pump means connected at the suction side thereof to a fluid reservoir and connected at the discharge side thereof to a supply line adapted for communication with an associated hydraulic device, the combination of a valve comprising a casing with a fluid chamber communicating with an inlet port connected to said line, and an outlet port connected to said reservoir, a bore within said casing, a valve stem reciprocally mounted within said bore and comprising means for closing said outlet port in the closed position of said stem, said stem having an area adapted to be acted upon by pressure fluid admitted through said inlet port for moving said stem to its open position, a housing associated with said casing and containing yielding means for continuously urging said stem toward its closed position, an adjustable orifice in the connection between said outlet port and said reservoir, and means for automatically varying the cross-sectional area of said orifice simultaneously with the variance of the discharge rate of said pump means.

8. In an hydraulic system comprising a variable discharge pump connected to a supply line for an associated hydraulic device, the combination of a relief valve in said line comprising a body with a downstream opening, a valve member in said body spring-pressed to its closed position for closing said opening, said valve member presenting an area adapted to be acted upon by pressure fluid within said body for urging said member to its open position, a restriction valve connected to said downstream opening and comprising a casing with a passage therethrough, valve means in said casing for gradually increasingly restricting flow of pressure fluid through said passage, and means for simultaneously actuating said valve means and decreasing the discharge rate of said pump, whereby a constant back-pressure is built up in said downstream opening for stabilizing said valve member in its open position.

9. In an hydraulic system, variable discharge pump means connected to a supply line adapted for communication with an associated hydraulic device, a relief valve in said line comprising a downstream opening and valve means for releasing said opening to discharge whenever the pressure within said line reaches a predetermined maximum value, means for varying the discharge rate of said pump means, and throttle means operatively connected to said last-mentioned means for retarding passage of fluid through said opening proportionately to the discharge rate of said pump means, whereby a uniform back-pressure is built up in said opening to dampen said valve means in its open position.

10. In an hydraulic system comprising a supply line adapted to be connected to an associated hydraulic device, a variable delivery pump connected to said line, and means for varying the discharge rate of said pump, the combination of a relief valve in said line comprising a downstream opening, and spring-pressed valve means for closing said opening, said valve means being operable to release said opening to discharge when the pressure in said line reaches a predetermined maximum value, throttle means for creating a constant back-pressure in the fluid passing through said opening, and an operative connection between said throttle means and said first-mentioned means.

11. In an hydraulic system comprising a supply line adapted to be connected to an associated hydraulic device, a variable discharge pump connected to said line, means for varying the discharge rate of said pump, and a relief valve mechanism in said line comprising a downstream orifice and spring-pressed valve means adapted to open said orifice to discharge when the pressure in said line reaches a predetermined maximum value, the combination of throttle means for creating a constant back-pressure in the fluid passing through said orifice, and control means operatively associated with said throttle means for automatically adjusting the same in response to actuation of said first-mentioned means.

12. In an hydraulic system comprising a supply line adapted to be connected to an associated hydraulic device, a variable delivery pump connected to said line, and means for varying the discharge rate of said pump, the combination of a relief valve in said line comprising a downstream orifice and valve means for opening said orifice to discharge when the pressure in said line reaches a predetermined maximum value, throttle means for creating a constant back-pressure in the fluid passing through said orifice, and an operative connection between said throttle means and said first-mentioned means.

13. In an hydraulic system, variable discharge pump means connected to a supply line adapted to communicate with an associated hydraulic device, a relief valve in said line comprising a downstream opening and valve means for releasing said opening to discharge whenever the fluid pressure within said system reaches a predetermined maximum value, and throttle means operatively associated with said opening for maintaining a constant back-pressure therein when said valve means is in its open position.

14. In an hydraulic system comprising variable discharge pump mechanism connected at the suction side thereof to a fluid reservoir and connected at the discharge side thereof to a supply line adapted for communication with an associated hydraulic device, the combination of a valve comprising a casing with a fluid chamber having an inlet port connected to said line and an outlet port connected to said reservoir, a bore within said casing communicating with said chamber, a valve stem reciprocally mounted within said bore and comprising means for closing said outlet port in the closed position of said stem, said stem having an area adapted to be acted upon by pressure fluid admitted through said inlet port for moving said stem to its open position, another chamber associated with said casing and housing yielding means for continuously urging said stem toward its closed position, a passageway through said stem for effecting hydraulic communication between said chambers to convey pressure fluid into said second-mentioned chamber for acting on an area of said stem in the same direction as said yielding means, said second-mentioned area being smaller than that which is acted upon by pressure fluid from said inlet port in the open position of said stem, an adjustable orifice in the connection between said outlet port and said reservoir, means for adjustably varying the discharge rate of said mechanism, and means for adjustably varying the cross-sectional area of said orifice and operatively connected to said last-mentioned means for actuation thereby for varying the cross-sectional area of said orifice simultaneously with the discharge rate of said mechanism.

15. In an hydraulic system, a variable discharge pump connected at the suction side thereof to a fluid reservoir and connected at the discharge side thereof to a supply line adapted for communication with an associated hydraulic device, a relief valve in said line comprising a downstream port connected to said reservoir and valve means for opening said port to discharge whenever the pressure within said line reaches a predetermined maximum value, an adjustable restriction valve in said connection between said port and said reservoir for regulating the flow of pressure fluid from said port to said reservoir, and means coupled to said pump and to said restriction valve for simultaneously varying the discharge rate of said pump and adjusting said restriction valve.

ROBERT K. SEDGWICK.

REFERENCES CITED

The following references are of record in the file of this patent:

UNITED STATES PATENTS

| Number | Name | Date |
| --- | --- | --- |
| 1,748,606 | Ingoldby | Feb. 25, 1930 |
| 2,134,803 | Rose | Nov. 1, 1938 |
| 2,323,021 | Ernst | June 29, 1943 |